US012810879B2

(12) United States Patent
Lim et al.

(10) Patent No.: US 12,810,879 B2
(45) Date of Patent: Nov. 24, 2026

(54) METHOD OF ENCODING/DECODING SPEECH SIGNAL AND DEVICE FOR PERFORMING THE SAME

(71) Applicants: Electronics and Telecommunications Research Institute, Daejeon (KR); UIF (University Industry Foundation), Yonsei University, Seoul (KR)

(72) Inventors: Woo-taek Lim, Daejeon (KR); Inseon Jang, Daejeon (KR); Seung Kwon Beack, Daejeon (KR); Hong-Goo Kang, Seoul (KR); Byeong Hyeon Kim, Seoul (KR); Jihyun Lee, Seoul (KR); Hyungseob Lim, Seoul (KR)

(73) Assignees: Electronics and Telecommunications Research Institute, Daejeon (KR); UIF (University Industry Foundation), Yonsei University, Seoul (KR)

( * ) Notice: Subject to any disclaimer, the term of this patent is extended or adjusted under 35 U.S.C. 154(b) by 196 days.

(21) Appl. No.: 18/747,007

(22) Filed: Jun. 18, 2024

(65) Prior Publication Data

US 2025/0006210 A1 Jan. 2, 2025

(30) Foreign Application Priority Data

Jun. 27, 2023 (KR) ........................ 10-2023-0082941

(51) Int. Cl.
*G10L 19/08* (2013.01)

(52) U.S. Cl.
CPC .................................... *G10L 19/08* (2013.01)

(58) Field of Classification Search
None
See application file for complete search history.

(56) References Cited

U.S. PATENT DOCUMENTS

| | | | | |
|---|---|---|---|---|
| 7,933,767 | B2 * | 4/2011 | Ojanpera | G10L 19/09 704/218 |
| 8,494,863 | B2 | 7/2013 | Biswas et al. | |
| 2008/0180307 | A1 * | 7/2008 | Ramo | G10L 19/032 341/200 |

(Continued)

FOREIGN PATENT DOCUMENTS

| | | | |
|---|---|---|---|
| KR | 10-2022-0005383 A | 1/2022 | |
| WO | WO 2023/064736 A1 | 4/2023 | |

OTHER PUBLICATIONS

Lee, Jihyun, et al. "DNN-based Long-Term Prediction in Speech Coding." Korean Society of Broadcasting and Media Engineering Summer Conference, 2023. (pp. 74-77).

(Continued)

*Primary Examiner* — Douglas Godbold
(74) *Attorney, Agent, or Firm* — NSIP Law

(57) ABSTRACT

A method of encoding/decoding a speech signal and a device for performing the same are provided. The method includes outputting, based on a first input speech signal of a previous timepoint and a second input speech signal of a current timepoint, a predicted signal that predicts the second input speech signal from the first input speech signal and obtaining, based on the second input speech signal and the predicted signal, a residual signal by removing a correlation between the first input speech signal and the second input speech signal from the second input speech signal.

10 Claims, 13 Drawing Sheets

(56) References Cited

U.S. PATENT DOCUMENTS

| | | | | |
|---|---|---|---|---|
| 2012/0245930 | A1* | 9/2012 | Jeon | G10L 19/07 704/219 |
| 2013/0030795 | A1 | 1/2013 | Sung et al. | |
| 2021/0074308 | A1* | 3/2021 | Skordilis | G06N 3/0455 |
| 2021/0366497 | A1 | 11/2021 | Lim et al. | |

OTHER PUBLICATIONS

Yang, Haici, Wootaek Lim and Minje Kim. "Neural feature predictor and discriminative residual coding for low-bitrate speech coding." arXiv: 2211.02506v1 [eess.AS] Nov. 4, 2022. (pp. 1-5).

Zhen, Kai, et al. "Efficient and scalable neural waveform coding with collaborative quantization." ICASSP 2020-2020 IEEE International Conference on Acoustics, Speech and Signal Processing (ICASSP). IEEE, 2020, arXiv:2002.05604v1 [eess.AS] Feb. 13, 2020.

* cited by examiner

850

METHOD OF ENCODING/DECODING SPEECH SIGNAL AND DEVICE FOR PERFORMING THE SAME

CROSS-REFERENCE TO RELATED APPLICATION

This application claims the benefit of Korean Patent Application No. 10-2023-0082941 filed on Jun. 27, 2023, in the Korean Intellectual Property Office, the entire disclosure of which is incorporated herein by reference for all purposes.

BACKGROUND

1. Field of the Invention

One or more embodiments relate to a method of encoding/decoding a speech signal and a device for performing the same.

2. Description of the Related Art

Speech compression is technology that compresses a speech signal into a smaller amount of data than an input signal while maintaining a perceptual quality of the speech signal and is widely used in a field closely related to daily life, such as mobile communications and real-time online media services. The existing speech codec was designed with a structure based on signal processing technology and speech generation and recognition theory to achieve high-efficiency and high-quality compression performance required by a target service.

Recently, a deep neural network (DNN)-based speech compression model has been proposed, which trains a parameter of the model based on a large amount of data using a deep learning method. A method of synthesizing speech from a characteristic parameter extracted from an encoder of an existing speech codec by borrowing (or designing) a neural vocoder capable of generating high-quality speech as a decoder or a method of training on a latent representation that may achieve more efficient compression based on rate-distortion has been attempted. In particular, an end-to-end training method that replaces an entire compression process with a DNN showed a low bit rate and high-quality restoration performance. Some DNN-based speech compression models have achieved low-latency performance capable of real-time compression. However, most DNN-based speech compression models utilize only a current frame as an input signal.

The above description has been possessed or acquired by the inventor(s) in the course of conceiving the present disclosure and is not necessarily an art publicly known before the present application is filed.

SUMMARY

Technology for compressing a voice signal through a long-term prediction based on a deep neural network (DNN) is required to remove redundancy between an input speech signal of a current timepoint and an input speech signal of a previous timepoint and perform encoding/decoding of the speech signal.

Embodiments provide technology for outputting a predicted signal that predicts a second input speech signal from a first input speech signal, based on the first input speech signal of a previous timepoint and the second input speech signal of a current timepoint.

Embodiments provide technology for obtaining a residual signal by removing a correlation between a first input speech signal and a second input speech signal from the second input speech signal, based on the second input speech signal and the predicted signal.

However, the technical aspects are not limited to the aforementioned aspects, and other technical aspects may be present.

According to an aspect, there is provided a method of encoding a speech signal including outputting, based on a first input speech signal of a previous timepoint and a second input speech signal of a current timepoint, a predicted signal that predicts the second input speech signal from the first input speech signal and obtaining, based on the second input speech signal and the predicted signal, a residual signal by removing a correlation between the first input speech signal and the second input speech signal from the second input speech signal.

The first input speech signal may have a same signal length as the second input speech signal and a greatest correlation with the second input speech signal.

The outputting of the predicted signal may include extracting feature information for predicting the second input speech signal, based on the first input speech signal and the second input speech signal, predicting a kernel based on the feature information, and generating the predicted signal based on the kernel and the first input speech signal. The kernel may be a weight applied to the first input speech signal when predicting the second input speech signal.

The method may further include outputting a bitstream. The bitstream may include a first bitstream encoding the feature information, a second bitstream encoding a delay value, and a third bitstream encoding the residual signal. The delay value may indicate a degree to which the first input speech signal is delayed from the second input speech signal.

The outputting of the bitstream may include quantizing the feature information and the residual signal, outputting the first bitstream by encoding quantized feature information, and generating the third bitstream by encoding a quantized residual signal.

According to another aspect, there is provided a method of decoding a speech signal including receiving bitstreams from an encoder, outputting, based on a first bitstream and a second bitstream, a predicted signal that predicts a second input speech signal of a current timepoint from a first input speech signal of a previous timepoint, and outputting a restored speech signal obtained by restoring the second input speech signal, based on the predicted signal and the third bitstream. The first bitstream may encode feature information for predicting the second input speech signal. The second bitstream may encode a delay value indicating a degree to which the first input speech signal is delayed from the second input speech signal. The third bitstream may encode a residual signal obtained by removing a correlation between the first input speech signal and the second input speech signal from the second input speech signal.

The first input speech signal may have a same signal length as the second input speech signal and a greatest correlation with the second input speech signal.

The outputting of the predicted signal may include obtaining the first input speech signal based on the second bitstream and generating the predicted signal based on the first bitstream and the first input speech signal.

The generating of the predicted signal may include predicting a kernel based on the first bitstream and generating the predicted signal based on the kernel and the first input speech signal. The kernel may be a weight applied to the first input speech signal when predicting the second input speech signal.

According to another aspect, there is provided a device for encoding a speech signal including a memory configured to store one or more instructions and a processor configured to execute the one or more instructions, wherein, when the one or more instructions are executed, the processor is configured to perform a plurality of operations. The plurality of operations may include outputting, based on a first input speech signal of a previous timepoint and a second input speech signal of a current timepoint, a predicted signal that predicts the second input speech signal from the first input speech signal and obtaining, based on the second input speech signal and the predicted signal, a residual signal by removing a correlation between the first input speech signal and the second input speech signal from the second input speech signal.

The first input speech signal may have a same signal length as the second input speech signal and a greatest correlation with the second input speech signal.

The outputting of the predicted signal may include extracting feature information for predicting the second input speech signal, based on the first input speech signal and the second input speech signal, predicting a kernel based on the feature information, and generating the predicted signal based on the kernel and the first input speech signal. The kernel may be a weight applied to the first input speech signal when predicting the second input speech signal.

The plurality of operations may further include outputting a bitstream. The bitstream may include a first bitstream encoding the feature information, a second bitstream encoding a delay value, and a third bitstream encoding the residual signal. The delay value may indicate a degree to which the first input speech signal is delayed from the second input speech signal.

The outputting of the bitstream may include quantizing the feature information and the residual signal, outputting the first bitstream by encoding quantized feature information, and generating the third bitstream by encoding a quantized residual signal.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
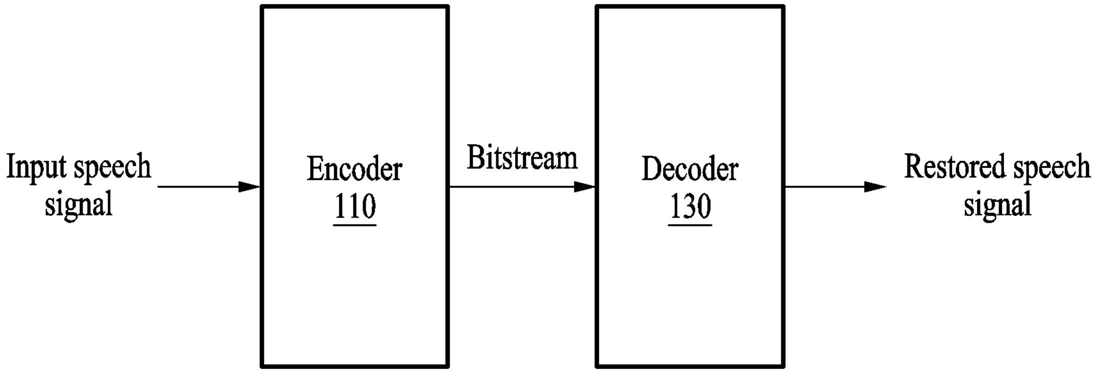
FIG. 1 is a diagram illustrating an encoder and a decoder according to an embodiment.

The following structural or functional description of examples is provided as an example only and various alterations and modifications may be made to the examples. Thus, an actual form of implementation is not construed as limited to the examples described herein and should be understood to include all changes, equivalents, and replacements within the idea and the technical scope of the disclosure.

Although terms such as first, second, and the like are used to describe various components, the components are not limited to the terms. These terms should be used only to distinguish one component from another component. For example, a "first" component may be referred to as a "second" component, and similarly, the "second" component may also be referred to as the "first" component.

It should be noted that when one component is described as being "connected," "coupled," or "joined" to another component, the first component may be directly connected, coupled, or joined to the second component, or a third component may be "connected," "coupled," or "joined" between the first and second components.

The singular forms "a," "an," and "the" are intended to include the plural forms as well, unless the context clearly indicates otherwise. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical and scientific terms have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Hereinafter, the examples are described in detail with reference to the accompanying drawings. When describing the examples with reference to the accompanying drawings, like reference numerals refer to like components and a repeated description related thereto is omitted.

FIG. 1 is a diagram illustrating an encoder and a decoder according to an embodiment.

Referring to FIG. 1, an encoder 110 may encode an input speech signal (e.g., 210-1 and 210-3 of FIG. 2) to generate a bitstream (e.g., a first bitstream, a second bitstream, and a third bitstream) and may transmit (or output) the bitstream to a decoder 130. The decoder 130 may decode the bitstream received from the encoder 110 to generate a restored speech signal (e.g., 330 of FIG. 3).

The encoder 110 may, based on a first input speech signal (e.g., 210-3 of FIG. 2) of a previous timepoint and a second input speech signal (e.g., 210-1 of FIG. 2) of a current timepoint, output a predicted signal (e.g., 275 of FIG. 2) that predicts the second input speech signal 210-1 from the first input speech signal 210-3. The first input speech signal 210-3 may include not only a speech signal immediately before the current timepoint but also a speech signal from a more distant past timepoint.

A distance of the first input speech signal 210-3 compared to a distance of the second speech signal 210-1, which indicates a degree of delay, may be expressed using a delay value. The delay value may indicate the degree to which the first input speech signal 210-3 is delayed from the second input speech signal 210-1. The delay value may be determined according to a sampling frequency of the speech signal. For example, when the sampling frequency is 44.1 KHz and the delay value is 1 millisecond (ms), it may indicate that the first input speech signal 210-3 is delayed from the second input speech signal 210-1 by 44.1 samples (or signals).

The encoder 110 may receive (or obtain, search, or select) the first input speech signal 210-3. The first input speech signal 210-3 may have a same signal length as the second input speech signal 210-1. The signal length may indicate a length of a frame of the signal. The first input speech signal 210-3 may have a greatest correlation with the second input speech signal 210-1. A high correlation may indicate high redundancy between signals. For example, when the length of the second input speech signal is "4," the length of the first input speech signal 210-3 may also be "4." The first input speech signal 210-3 may be a signal with a greatest redundancy with the second input speech signal 210-1 among past signals having a length of "4." In other words, a signal component of the frame of the first input speech signal 210-3 of each timepoint may include same components as a signal component of the frame of the second input speech signal 210-1 of each timepoint the most.

The predicted signal 275 may be a signal that predicts (or infers) part and/or all of the second input speech signal 210-1 from the first input speech signal 210-3. For example, the predicted signal 275 may be a same signal as part and/or all of the second input speech signal 210-1.

The encoder 110 may output the predicted signal 275 based on the first input speech signal 210-3 and the second input speech signal 210-1. The encoder 110 may extract feature information (e.g., 235-1 of FIG. 2) for predicting the first input speech signal 210-1, based on the first input speech signal 210-3 and the second input speech signal 210-1. The encoder 110 may predict a kernel (e.g., 255 of FIG. 2) based on the feature information 235-1. The feature information 235-1 may include information needed to predict the second input speech signal 210-1 from the first input speech signal 210-3. The kernel 255 may be a weight applied to the first input speech signal 210-3 when predicting the second input speech signal 210-1. That is, the kernel 255 may be a value by which the first input speech signal 210-3 is multiplied. An operation of outputting the predicted signal 275 by the encoder 110 is described in detail with reference to FIG. 2.

The encoder 110 may, based on the second input speech signal 210-1 and the predicted signal 275, obtain a residual signal (e.g., 290 of FIG. 2) by removing a correlation between the first input speech signal 210-3 and the second input speech signal 210-1 from the second input speech signal 210-1. For example, the encoder 110 may obtain the residual signal 290 by removing the predicted signal 275 from the second input speech signal 210-1. The residual signal 290 may indicate a difference between the second input speech signal 210-1 and the predicted signal 275. The residual signal 290 may be expressed by a lower bit rate than the second input speech signal 210-1.

The encoder 110 may output a bitstream to the decoder 130. The encoder 110 may generate bitstreams by encoding the feature information 235-1, the delay value, and the residual signal 290. The bitstream may include a first bitstream encoding the feature information 235-1, a second bitstream encoding the delay value, and a third bitstream encoding the residual signal 290. The encoder 110 may output the first bitstream to the third bitstream to the decoder 130.

The decoder 130 may receive a bitstream (including the first bitstream, the second bitstream, and the third bitstream) from the encoder 110. The decoder 130 may obtain quantized feature information 235-3 by decoding the first bitstream. The decoder 130 may obtain a delay value (not shown) by decoding the second bitstream. The decoder 130 may obtain a quantized residual signal 310 by decoding the third bitstream.

The decoder 130 may, based on the first bitstream and the second bitstream, output the predicted signal 275 that predicts the second input speech signal 210-1 of the current timepoint from the first input speech signal 210-3 of the previous timepoint. The decoder 130 may obtain the first input speech signal 210-3 based on the second bitstream. The decoder 130 may generate the predicted signal 275 based on the first bitstream and the first input speech signal 210-3.

The decoder 130 may output the restored speech signal 330 obtained by restoring the second input speech signal 210-1, based on the predicted signal 275 and the third bitstream. The decoder 130 may obtain a quantized residual signal 310 by decoding the third bitstream. The decoder 130 may output the restored speech signal 330 based on the quantized residual signal 310 and the predicted signal 275.

Figure 2:
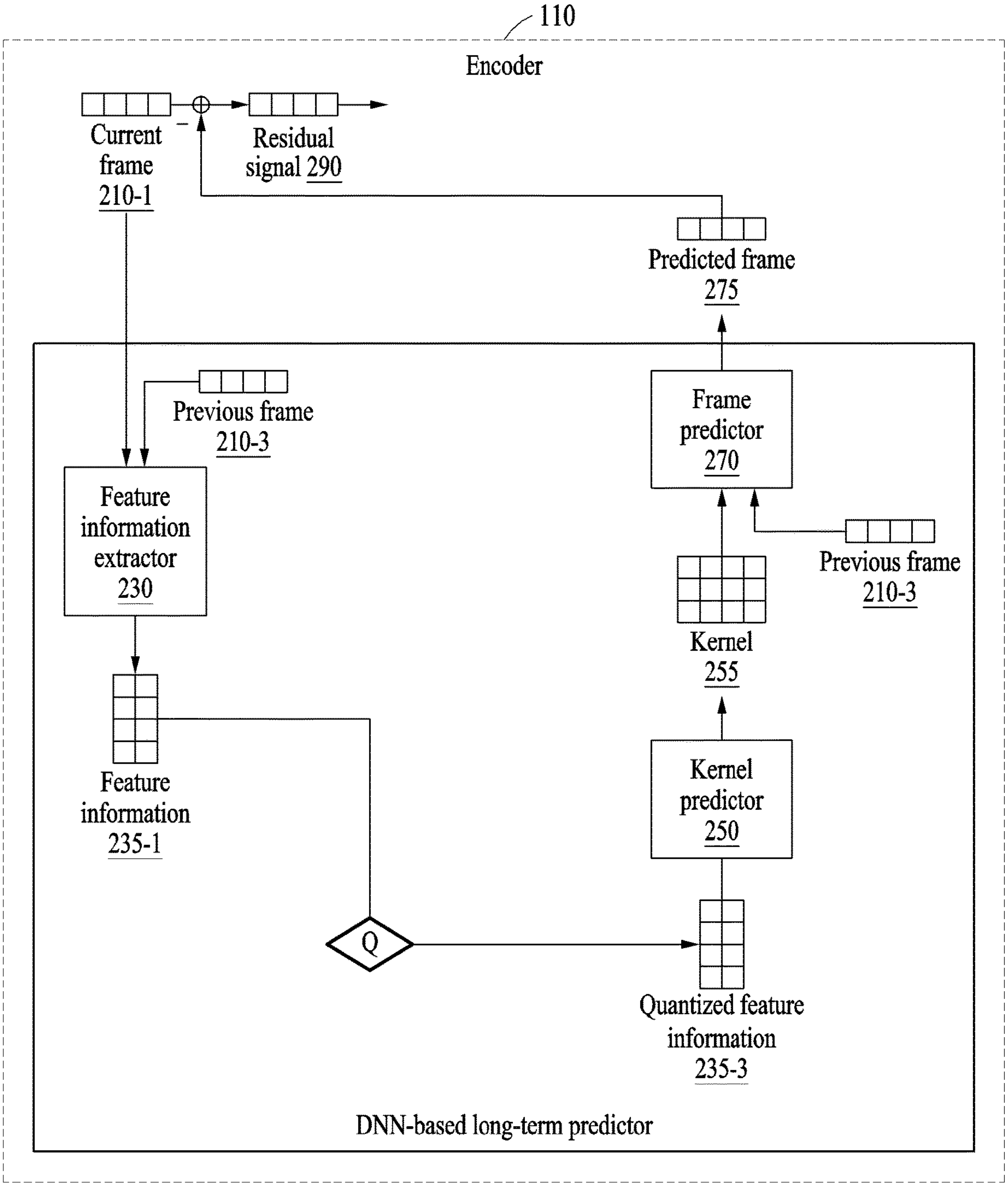
FIG. 2 is an example of a diagram of the encoder shown in FIG. 1.

FIG. 2 is an example of a diagram of the encoder shown in FIG. 1.

Referring to FIG. 2, the encoder 110 may include a feature information extractor 230, a kernel predictor 250, and a frame predictor 270. The encoder 110 may, based on the first input speech signal 210-3 of the previous timepoint and the second input speech signal 210-1 of the current timepoint, output the predicted signal 275 that predicts the second input speech signal 210-1 of the current timepoint from the first input speech signal 210-3 of the previous timepoint.

The encoder 110 may receive the second input speech signal 210-1. The encoder 110 may receive the first input speech signal 210-3 or obtain (or calculate) the first input speech signal 210-3 from the second input speech signal 210-1. The first input speech signal 210-3 may be, among input speech signals of the previous timepoint, a signal that has a same signal length as the second input speech signal 210-1 and that has a greatest correlation with the second input speech signal 210-1. For example, when a length of the second input speech signal 210-1 is "T," the length of the first input speech signal 210-3 may be "T." In addition, the first input speech signal 210-3 may have a greatest redundancy with the second input speech signal 210-1. The greatest redundancy may indicate that a frame of the signal includes the most identical components.

Figure 4:
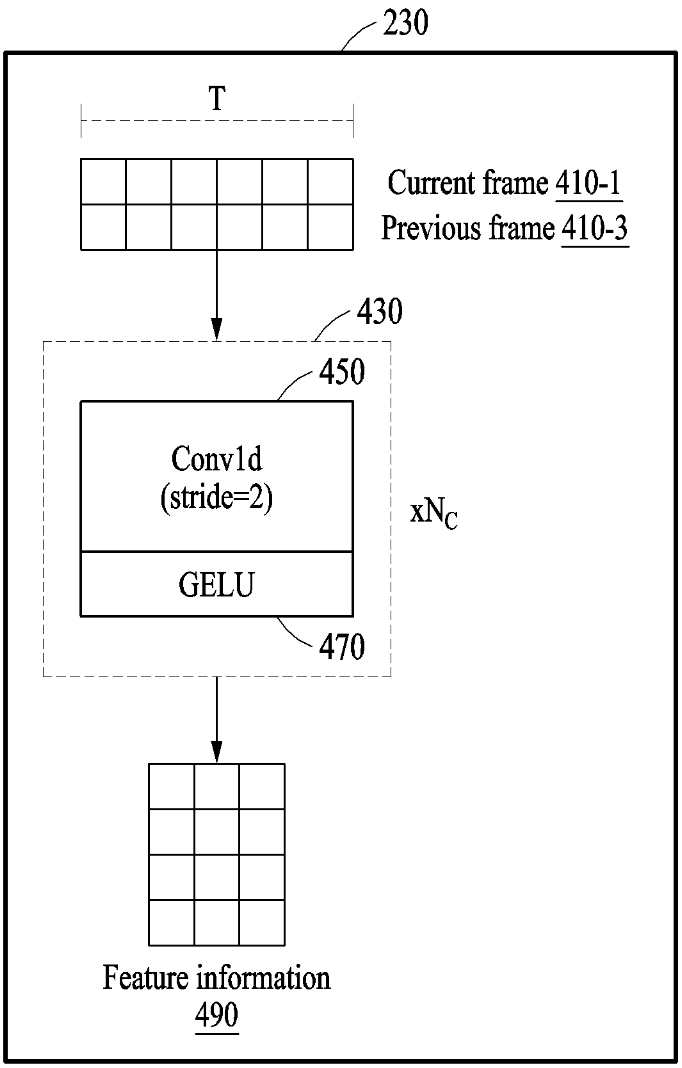
FIG. 4 is an example of the feature information extractor shown in FIG. 2.

The feature information extractor 230 may extract the feature information 235-1 based on the first input speech signal 210-3 and the second input speech signal 210-1. For example, the feature information extractor 230 may connect the first input speech signal 210-3 and the second input speech signal 210-1 to an axis of a channel (e.g., a vertical axis of a cell to which 410-1 and 410-3 of FIG. 4 are connected). The feature information extractor 230 may extract, from a connected signal, the feature information 235-1 of a compressed size compared to a size (e.g., "T" of FIG. 4) of an input signal. The feature information 235-1 may include information needed to predict the second input speech signal 210-1 from the first input speech signal 210-3. The information needed to predict the second input speech signal 210-1 may be related to the correlation (or redundancy) between the first input speech signal 210-3 and the second input speech signal 210-1. A configuration of the feature information extractor 230 is described in detail with reference to FIG. 4.

The encoder 110 may predict the kernel 255 based on the feature information 235-1. To stabilize (or optimize) transmission of the feature information 235-1, the encoder 110 may quantize the feature information 235-1. The encoder 110 may transmit the quantized feature information 235-3 to the kernel predictor 250.

The kernel predictor 250 may receive the quantized feature information 235-3 from the encoder 110. The kernel predictor 250 may obtain the feature information 235-1 by de-quantizing the quantized feature information 235-3. The kernel predictor 250 may predict the kernel 255 based on the feature information 235-1. The kernel predictor 250 may transmit (or output) the kernel 255 to the frame predictor 270. For example, the kernel predictor 250 may reflect a correlation of an input speech signal (including the first input speech signal and the second input speech signal) on a time axis. The kernel predictor 250 may upsample the feature information 235-1 according to the length "T" of the second input speech signal 210-1 and the first input speech signal 210-3 through linear interpolation. The kernel predictor 250 may generate "T" (a number of horizontal cells of 255) kernels 255 having "K" (a number of vertical cells of 255) dimensions from an upsampled result. The kernel predictor 250 may transmit the generated kernels 255 to the frame predictor 270.

The kernel 255 may be a weight that is multiplied to the signal component of the frame of the first input speech signal 210-3 of each timepoint so that the first input speech signal 210-3 may be equal to the second input speech signal 210-1. The kernel 255 may correspond to each timepoint of the frame of the first input speech signal 210-3. For example, when the frame length of the first input speech signal 210-3 is "T," the kernel predictor 250 may generate "T" kernels 255. Among the kernels 255, a one-dimensional kernel (e.g., a leftmost 1 (horizontal)×3 (vertical) cell of the kernel 255) may correspond to a first timepoint (a leftmost cell of the first input speech signal 210-3) of the frame of the first input speech signal 210-3. A configuration of the kernel predictor 250 is described in detail with reference to FIG. 5.

The frame predictor 270 may receive the kernel 255 from the kernel predictor 250. The frame predictor 270 may generate the predicted signal 275 based on the kernel 255 and the first input speech signal 210-3. For example, the frame predictor 270 may receive the "T" kernels 255 having "K" dimensions from the kernel predictor 250. The frame predictor 270 may apply the kernel 255 to the first input speech signal 210-3 (which may be a signal having the frame length of "T"). This is described in detail with reference to FIG. 6.

The encoder 110 may generate the residual signal 290 based on the second input speech signal 210-1 and the predicted signal 275. For example, the encoder 110 may obtain the residual signal 290 by removing the predicted signal 275 from the second input speech signal 210-1. The residual signal 290 may be a signal obtained by removing a correlation between input speech signals (including the first input speech signal 210-3 and the second input speech signal 210-1) from the second input speech signal 210-1. That is, the residual signal 290 may be a signal obtained by removing an overlapping portion (i.e., identical signal components of each timepoint of the frame) between the first input speech signal 210-3 and the second input speech signal 210-1 from the second input speech signal 210-1.

The encoder 110 may output (or transmit) a bitstream to the decoder 130. For example, the encoder 110 may quantize the feature information 235-1 and the residual signal 290. The encoder 110 may generate a first bitstream by encoding the quantized feature information 235-3. The encoder 110 may generate a third bitstream by encoding a quantized residual signal (e.g., the quantized residual signal 310 of FIG. 3). The encoder 110 may generate a second bitstream by encoding a delay value. The encoder 110 may output (or transmit) the first bitstream to the third bitstream to the decoder 130.

Figure 3:
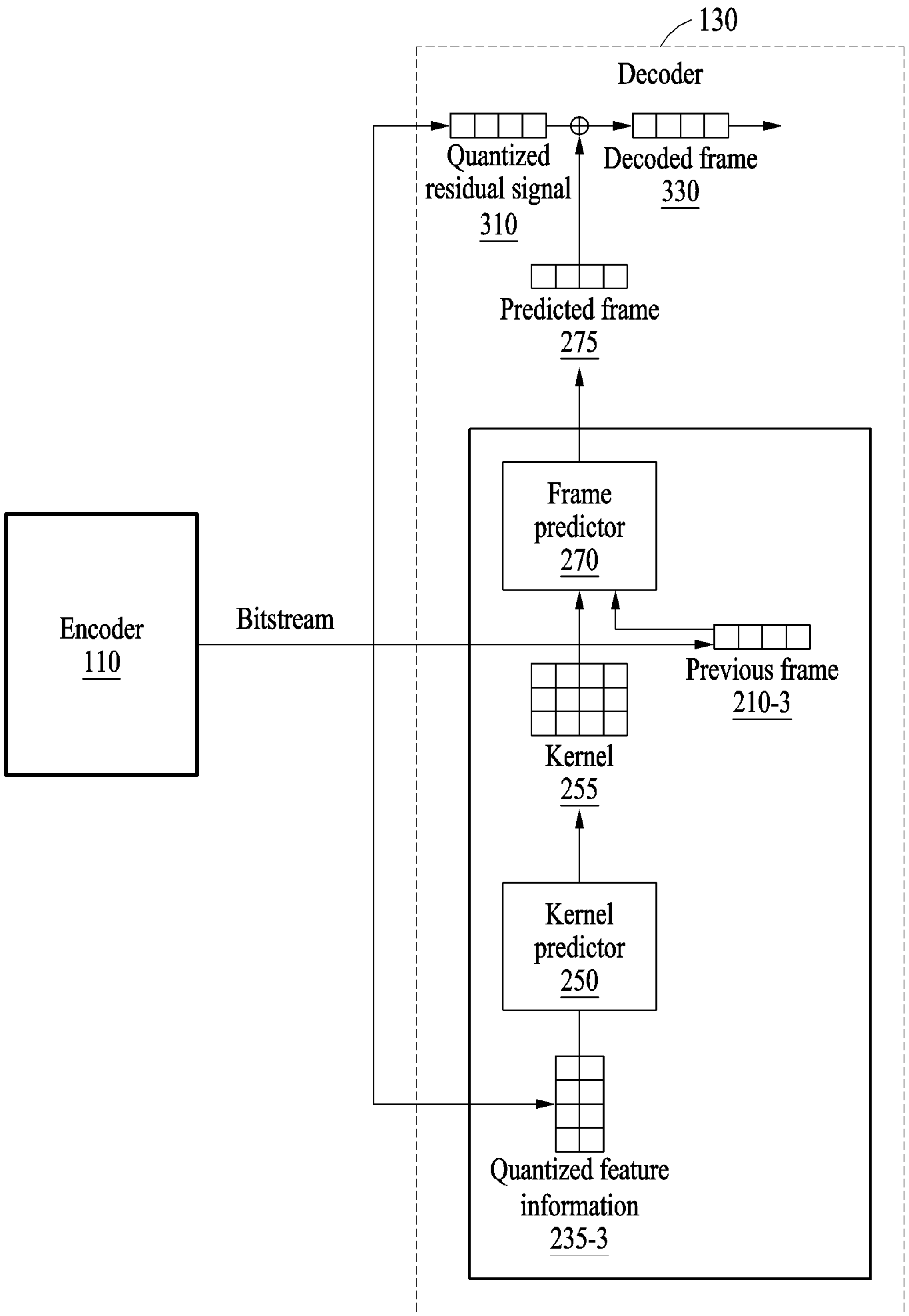
FIG. 3 is an example of a diagram of the decoder shown in FIG. 1.

FIG. 3 is an example of a diagram of the decoder shown in FIG. 1.

Referring to FIG. 3, the decoder 130 may include the kernel predictor 250 and the frame predictor 270.

The decoder 130 may receive a bitstream from the encoder 110. The bitstream may include a first bitstream to a third bitstream. The decoder 130 may, based on the first bitstream and the second bitstream, output the predicted signal 275 that predicts the second input speech signal 210-1 of the current timepoint from the first input speech signal 210-3 of the previous timepoint.

The decoder 130 may obtain the first input speech signal 210-3 based on the second bitstream. For example, the decoder 130 may obtain a delay value (not shown) by decoding the second bitstream. The decoder 130 may calculate how much the first input speech signal 210-3 is delayed based on the current timepoint through the delay value. The decoder 130 may obtain the first input speech signal 210-3 according to a calculated result.

The decoder 130 may generate the predicted signal 275 based on the first bitstream and the first input speech signal 210-3. The decoder 130 may predict the kernel 255 based on the first bitstream. The decoder 130 may generate the predicted signal 275 based on the kernel 255 and the first input speech signal 210-3.

The decoder 130 may obtain the quantized feature information 235-3 by decoding the first bitstream. The decoder 130 may output (or transmit) the quantized feature information 235-3 to the kernel predictor 250. The decoder 130 may predict the kernel 255 from the quantized feature information 235-3 through the kernel predictor 250. In addition, the decoder 130 may generate the predicted signal 275 from the kernel 255 and the first input speech signal 210-3 through the frame predictor 270.

Here, the kernel predictor 250 and the frame predictor 270 may operate substantially the same in the encoder 110 and the decoder 130. Accordingly, since the operation of the kernel predictor 250 in the encoder 110 has been described in detail, redundant description is omitted below.

The decoder 130 may output the restored speech signal 330 obtained by restoring the second input speech signal 210-1, based on the predicted signal 275 and the third bitstream. For example, the decoder 130 may obtain the quantized residual signal 310 by decoding the third bitstream. The decoder 130 may obtain the residual signal 290 by de-quantizing the quantized residual signal 310. The residual signal 290 may be a signal obtained by removing the predicted signal 275 from the second input speech signal 210-1. The decoder 130 may output the restored speech signal 330 obtained by restoring the second input speech signal 210-1 by adding the residual signal 290 to the predicted signal 275.

FIG. 4 is an example of the feature information extractor shown in FIG. 2.

Referring to FIG. 4, the feature information extractor 230 may include a plurality of layers 430. The layers 430 may include a layer 450 and a layer 470. The layer 450 and the layer 470 may form a pair. However, the embodiments are not limited thereto, and the layer 430 may include different numbers of layers (e.g., the layer 450 and the layer 470).

The layer 450 and the layer 470 may be a neural network. The neural network may include a deep neural network (DNN) model. The neural network may include a convolutional neural network (CNN), a recurrent neural network (RNN), a perceptron, a multiplayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN).

For example, the feature information extractor 230 may include "N" layers 430. The layer 450 may include a CNN. The layer 450 may include a CNN using a stride. As a size of the stride increases, a size and number of pieces of feature information may decrease. The layer 470 may include a Gaussian error linear unit (GELU) activation function. The feature information extractor 230 may include "N" CNNs and a GELU activation function.

The feature information extractor 230 may extract feature information 490 based on the first input speech signal 410-3 of a previous timepoint and the second input speech signal 410-1. This has been described in detail with reference to FIG. 2 and is omitted hereinafter.

Figure 5:
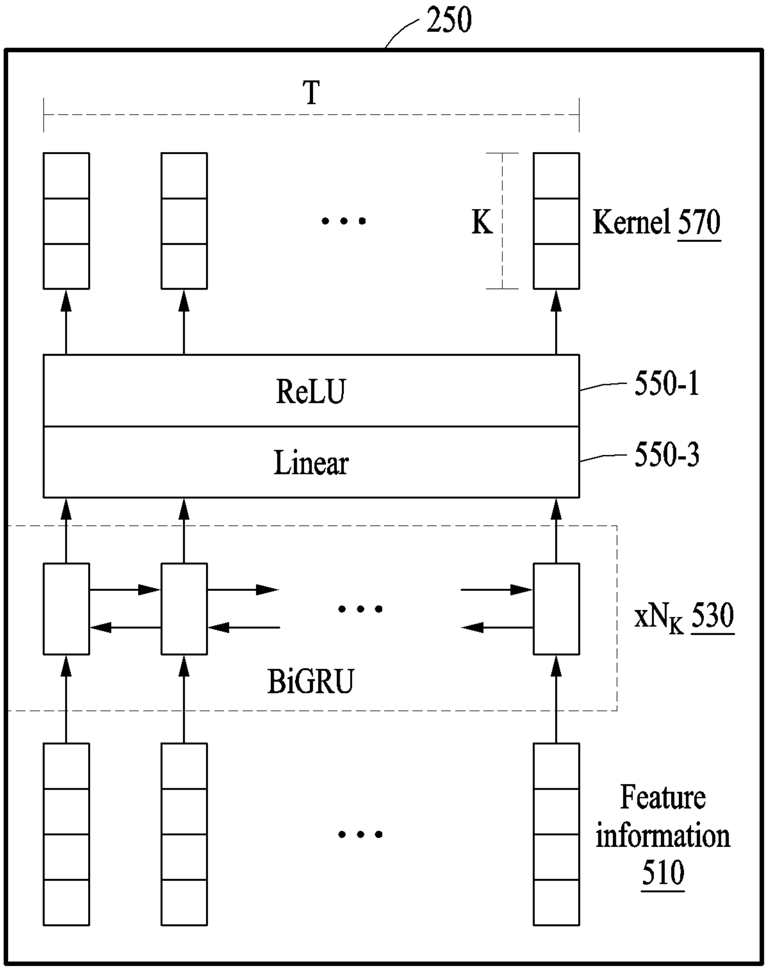
FIG. 5 is an example of the kernel predictor shown in FIGS. 2 and 3.

FIG. 5 is an example of the kernel predictor shown in FIGS. 2 and 3.

Referring to FIG. 5, the kernel predictor 250 may include a plurality of layers (e.g., a first layer 530 and a second layer 550). The plurality of layers (e.g., the first layer 530 and the second layer 550) may be a neural network. The neural network may include an RNN to reflect a correlation of an input speech signal (including the first input speech signal 210-3 and the second input speech signal 210-1) on a time axis.

For example, the first layer 530 may include a plurality of RNNs. The second layer 550 may include a rectified linear unit (ReLU) activation function 550-1 and a linear layer 550-3. The first layer 530 may include "NK" bidirectional gated recurrent units (BiGRUs). The "K" dimension of kernels 570 may be determined according to the output dimension of the linear layer 550-3 of the second layer 550. and the number of kernels 570 may be determined according to a signal length (or a frame length) T of the input speech signal (including the first input speech signal 210-3 and the second input speech signal 210-1).

The kernel predictor 250 may predict the kernel 570 based on feature information 510. This has been described in detail with reference to FIG. 2 and is omitted hereinafter.

Figure 6:
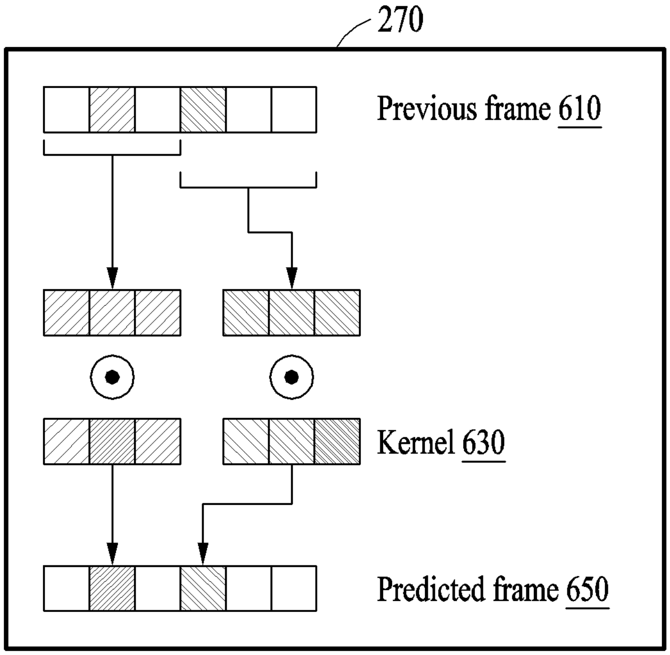
FIG. 6 shows an example of the frame predictor shown in FIGS. 2 and 3.

FIG. 6 shows an example of the frame predictor shown in FIGS. 2 and 3.

Referring to FIG. 6, the frame predictor 270 may generate a predicted signal 650 based on a first input speech signal 610 and a kernel 630. The frame predictor 270 may receive a kernel (e.g., the kernel 255 and the kernel 570) from the kernel predictors 250.

The frame predictor 270 may multiply the first input speech signal 610 by the kernel 630 so that each timepoint of a frame of the first input speech signal 610 corresponds to a dimension of the kernel 630. The frame predictor 270 may multiply the first input speech signal 610 by the kernel 630 by adjusting a surrounding timepoint of a multiplication point (i.e., each timepoint of the frame of the first input speech signal 610) to the dimension of the kernel 630. For example, a signal length of the first input speech signal 610 may be "6." The frame predictor 270 may receive six three-dimensional kernels (e.g., the kernel 255 and the kernel 570) from the kernel predictors 250 and 570. Here, the surrounding timepoint of the multiplication point may include timepoints distributed by as many times as the number (e.g., 3) of dimensions of the kernel with the multiplication point as a center (or a reference). The frame predictor 270 may generate (or calculate) a signal component of the predicted signal 650 (i.e., a signal component of the predicted signal 650 at a timepoint corresponding to the multiplication point of the first input speech signal 610) by multiplying a signal component of the multiplication point (including the surrounding timepoint) of the first input speech signal 610 and a component of a kernel corresponding to the multiplication point. The frame predictor 270 may repeat the above operation by as many times as the signal length (e.g., 6) of the first input speech signal 610 to generate (or calculate) signal components of all points of the predicted signal 650. The frame predictor 270 may generate the predicted signal 650.

Figure 7:
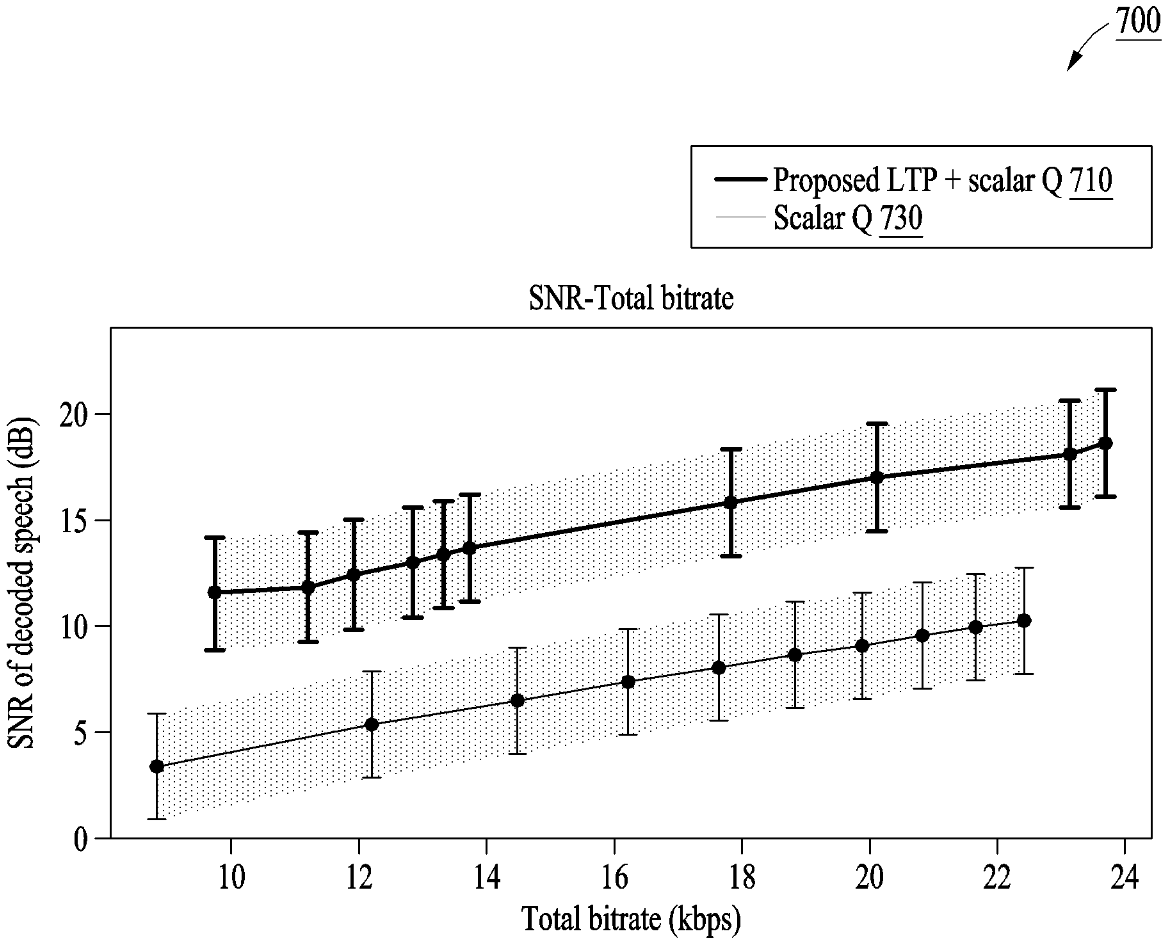
FIG. 7 is a diagram illustrating performance of signal-to-noise ratio (SNR) compared to a bit rate of an encoding method and a decoding method, according to an embodiment.

FIG. 7 is a diagram illustrating performance of signal-to-noise ratio (SNR) compared to a bit rate of an encoding method and a decoding method, according to an embodiment.

Referring to FIG. 7, a graph 710 indicates the SNR compared to the bit rate of the encoder 110 and the decoder 130. A graph 730 indicates the SNR compared to the bit rate of a reference encoding/decoding model. The reference encoding/decoding model may refer to a model that does not use a long-term prediction (e.g., a DNN-based long-term prediction) of the encoder 110 and the decoder 130.

For example, the graph 710 may show a higher SNR value than the graph 730 at a bit rate of a same degree (or level). This may indicate that an encoding method and a decoding method of the encoder 110 and the decoder 130 may improve quality of the restored speech signal 330 of a same bit rate compared to the reference encoding/decoding model.

Figure 8A:
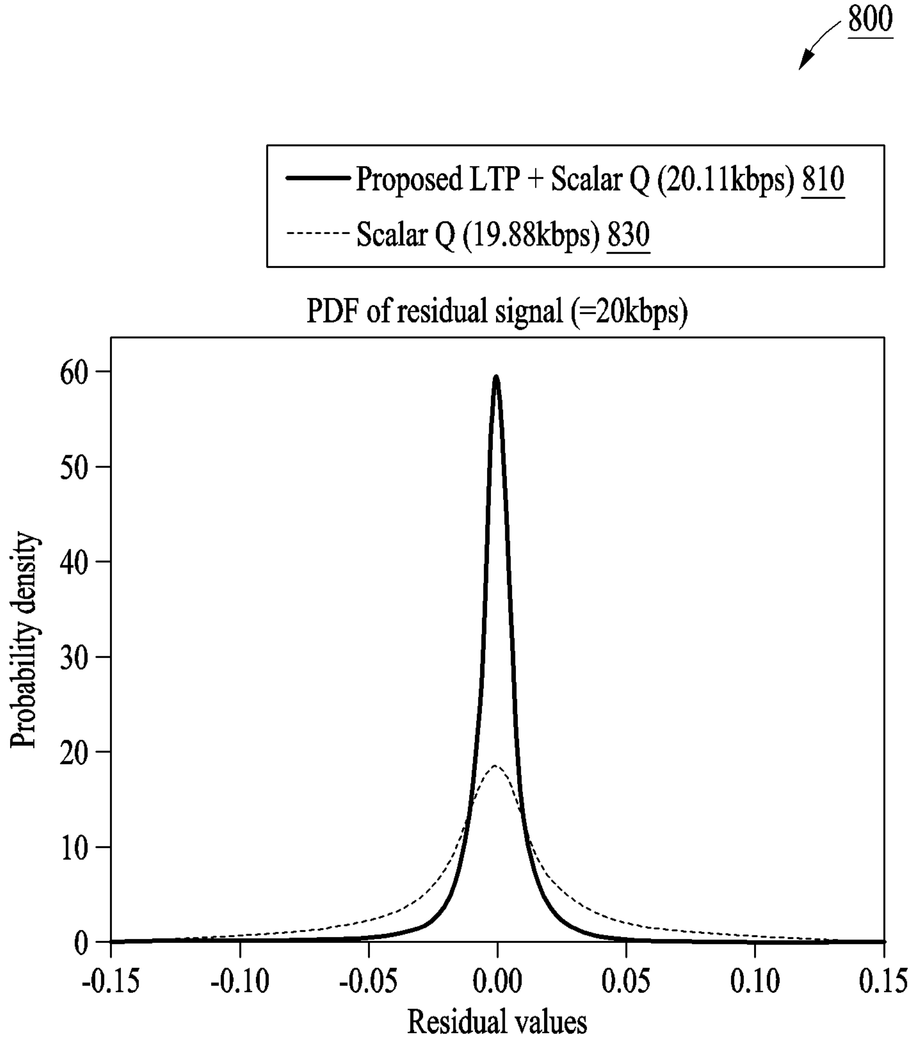
FIGS. 8A and 8B each illustrate a probability density function of a residual signal, according to an embodiment.
Figure 8B:
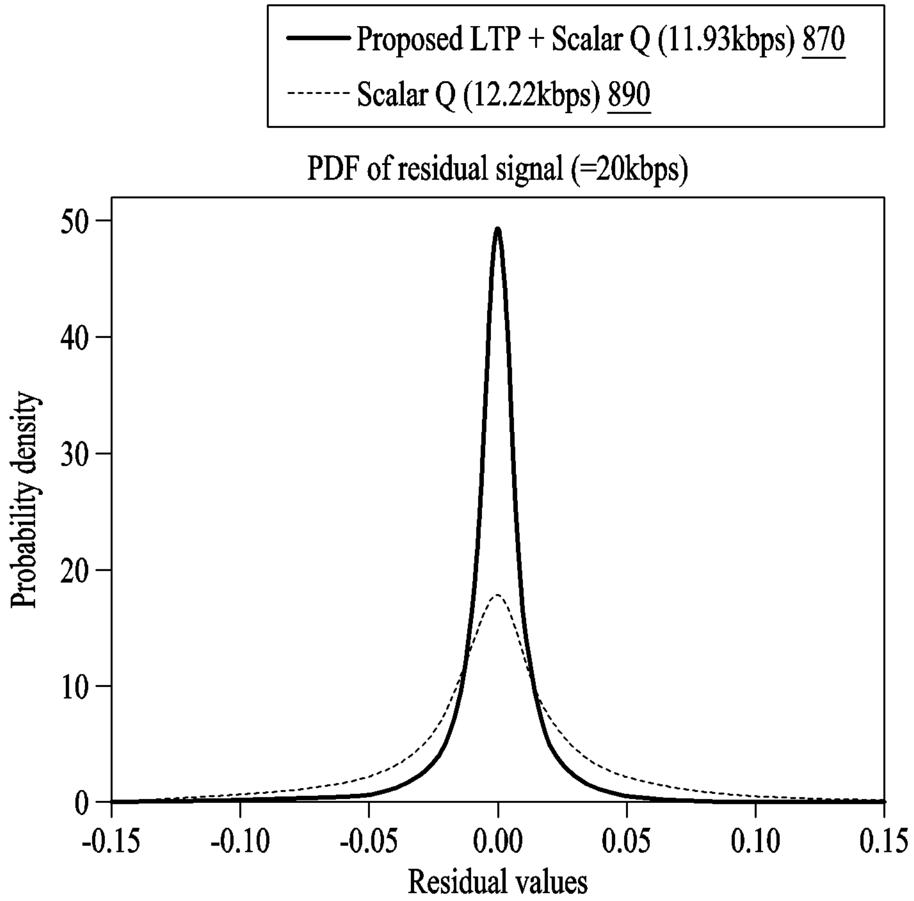

FIGS. 8A and 8B each illustrate a probability density function of a residual signal, according to an embodiment.

Referring to FIG. 8A, a graph 800 illustrates a change in distribution of the residual signal 290 when a bit rate is 20 kilobits per second (kbps). A graph 810 illustrates a probability density function (PDF) of the residual signal 290 of the encoder 110 and the decoder 130. In addition, a graph 830 illustrates a PDF of the residual signal 290 of the reference encoding/decoding model. The reference encoding/decoding model may refer to a model that does not use a long-term prediction (e.g., a DNN-based long-term prediction) of the encoder 110 and the decoder 130.

The graph 810 may have less variance in a residual signal distribution than the graph 830. When the encoding method and the decoding method of the encoder 110 and the decoder 130 are used, an entropy model may be trained to use a smaller step size when quantizing the residual signal 290, thereby improving the quality of the restored speech signal 330.

Referring to FIG. 8B, a same result as in the graph 800 may also be observed when the bit rate is 12 kbps. Accordingly, a detailed description thereof is omitted.

Figure 9:
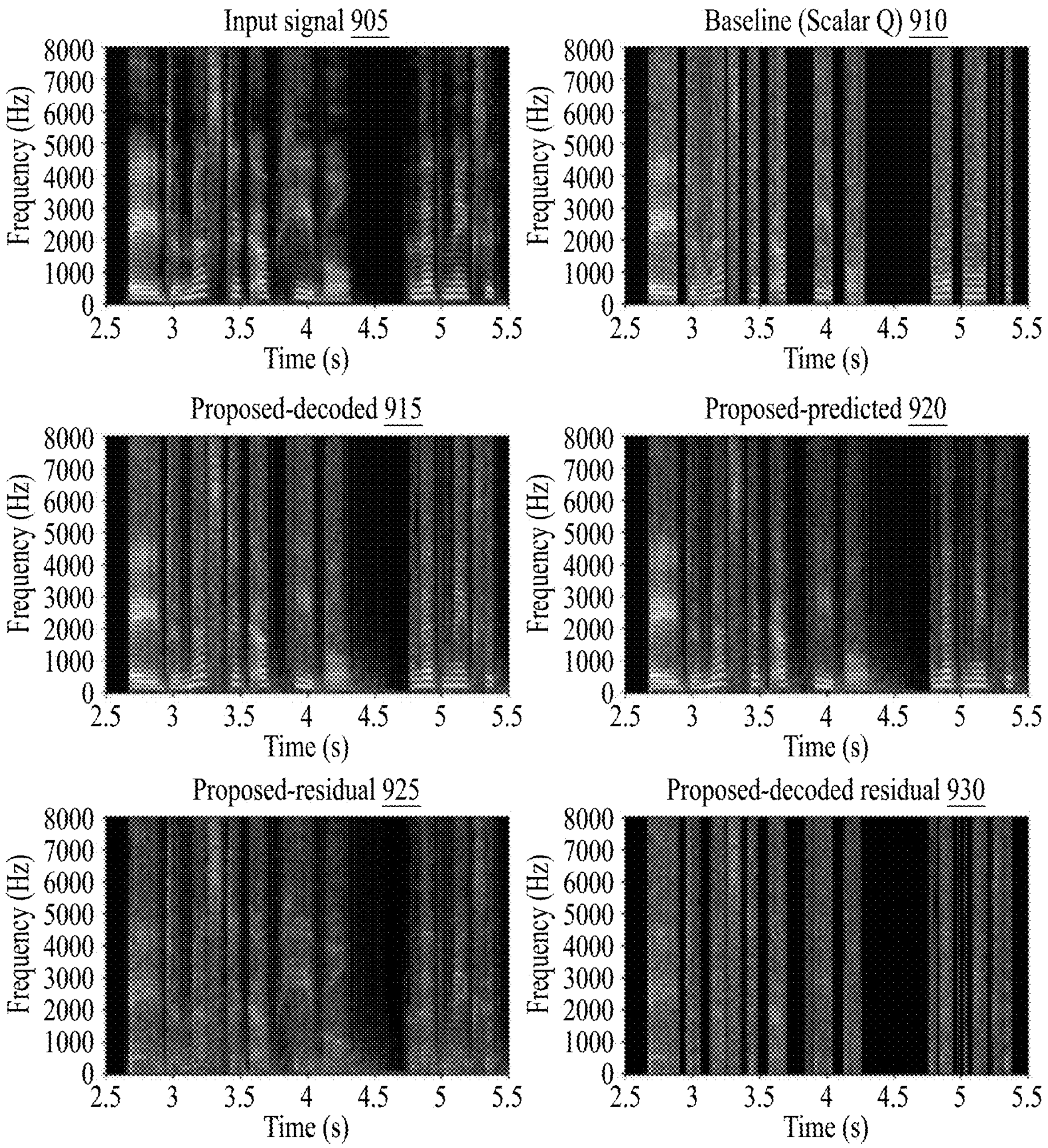
FIG. 9 illustrates a spectrogram of a signal according to an embodiment.

FIG. 9 illustrates a spectrogram of a signal according to an embodiment.

Referring to FIG. 9, a spectrogram 905 to a spectrogram 930 illustrate spectrograms of signals at a bit rate of 20 kbps. The spectrogram 905 may be a spectrogram of the second input speech signal 210-1. A spectrogram 910 may be a spectrogram of a restored speech signal of a reference encoding/decoding model (e.g., a model that does not use a long-term prediction (e.g., a DNN-based long-term prediction) of the encoder 110 and decoder 130). The spectrogram 915 may be a spectrogram of the restored speech signal 330. The spectrogram 920 may be a spectrogram of the predicted signal 275. The spectrogram 925 may be a spectrogram of the residual signal 290. The spectrogram 930 may be a spectrogram of a restored residual signal (e.g., a residual signal obtained by de-quantizing the quantized residual signal 310 by the decoder 130).

For example, the spectrogram 915 may have a more natural harmonic structure than the spectrogram 910. By this, it may be confirmed that the encoding method and the decoding method according to the encoder 110 and the decoder 130 restore the second input speech signal 210-1 more accurately than the reference models. This may be because the predicted signal 275 has been directly reflected in the restored speech signal 330 without direct quantization. In addition, the spectrograms 915, 920, 925, and 930 may have reduced noise than the spectrogram 910.

Figure 10:
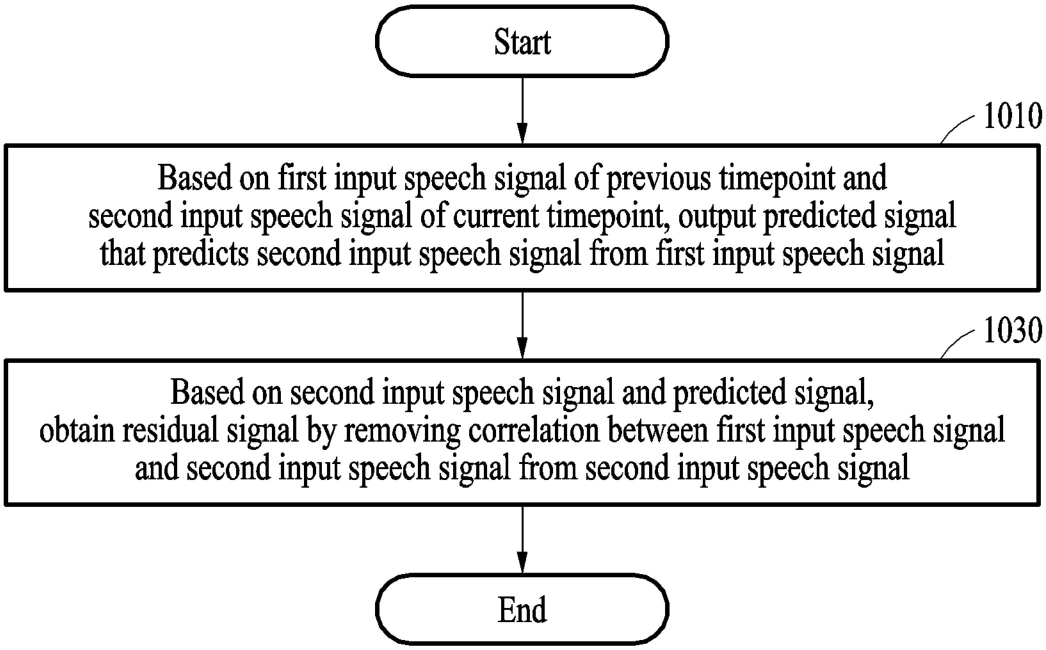
FIG. 10 is a flowchart illustrating an example of an encoding method, according to an embodiment.

FIG. 10 is a flowchart illustrating an example of an encoding method, according to an embodiment.

Referring to FIG. 10, the encoder 110 may, based on the first input speech signal 210-3 of a previous timepoint and the second input speech signal 210-1 of a current timepoint, output the predicted signal 275 that predicts the second input speech signal 210-1 from the first input speech signal 210-3 in operation 1010. The first input speech signal 210-3 may include not only a speech signal immediately before the current timepoint but also a speech signal from a more distant past timepoint. The encoder 110 may generate the predicted signal 275 to remove an overlapping signal (e.g., an overlapping signal component between the first input speech signal 210-3 and the second input speech signal 210-1) from the second input speech signal 210-1.

In operation 1030, the encoder 110 may, based on the second input speech signal 210-1 and the predicted signal 275, obtain the residual signal 290 by removing a correlation between the first input speech signal 210-3 and the second input speech signal 210-1 from the second input speech signal 210-1. For example, the encoder 110 may obtain the residual signal 290 by removing the predicted signal 275 from the second input speech signal 210-1. Removing the predicted signal 275 from the second input speech signal 210-1 may indicate removing a component among components of the second input speech signal 210-1 that is identical to the predicted signal 275.

Figure 11:
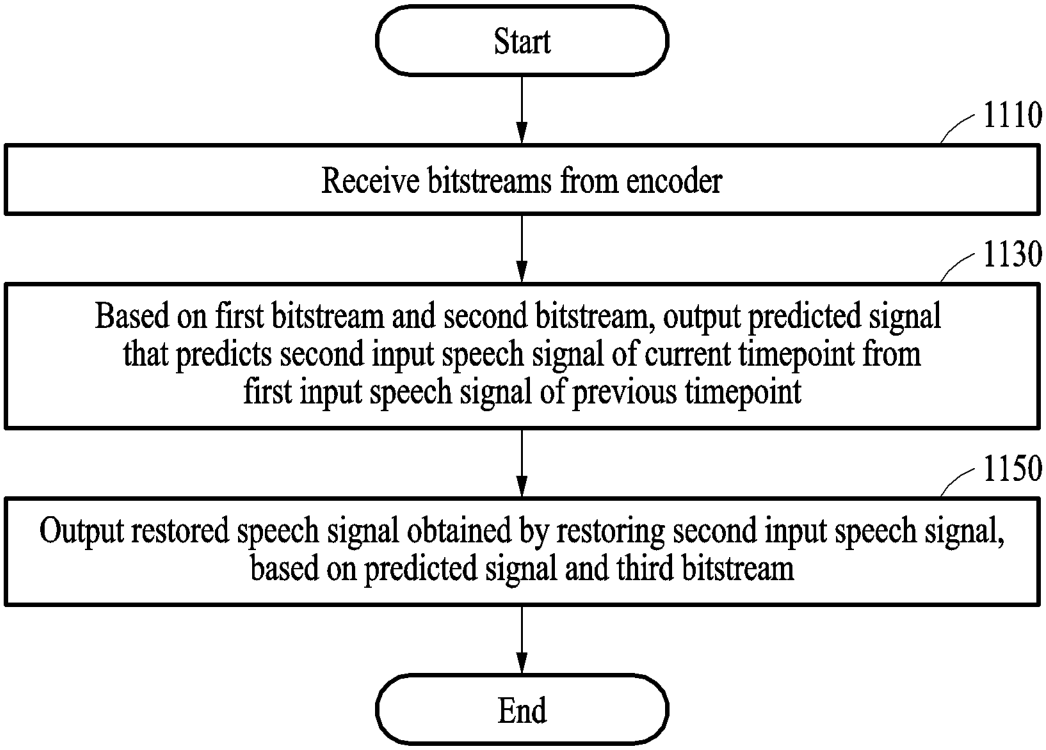
FIG. 11 is a flowchart illustrating an example of a decoding method, according to an embodiment.

FIG. 11 is a flowchart illustrating an example of a decoding method, according to an embodiment.

Referring to FIG. 11, the decoder 130 may receive bitstreams from the encoder 110 in operation 1110. For example, the bitstream may include a first bitstream encoding the feature information 235-1, a second bitstream encoding a delay value (not shown), and a third bitstream encoding the residual signal 290. The decoder 130 may obtain the feature information 235-1 by decoding and de-quantizing the first bitstream. The decoder 130 may obtain a delay value (not shown) by decoding the second bitstream. The decoder 130 may obtain the residual signal 290 by decoding and de-quantizing the third bitstream.

In operation 1130, the decoder 130 may, based on the first bitstream and the second bitstream, output the predicted signal 275 that predicts the second input speech signal 210-1 of a current timepoint from the first input speech signal 210-3 of a previous timepoint.

In operation 1150, the decoder 130 may output the restored speech signal 330 obtained by restoring the second input speech signal 210-1, based on the predicted signal 275 and the third bitstream.

Figure 12:
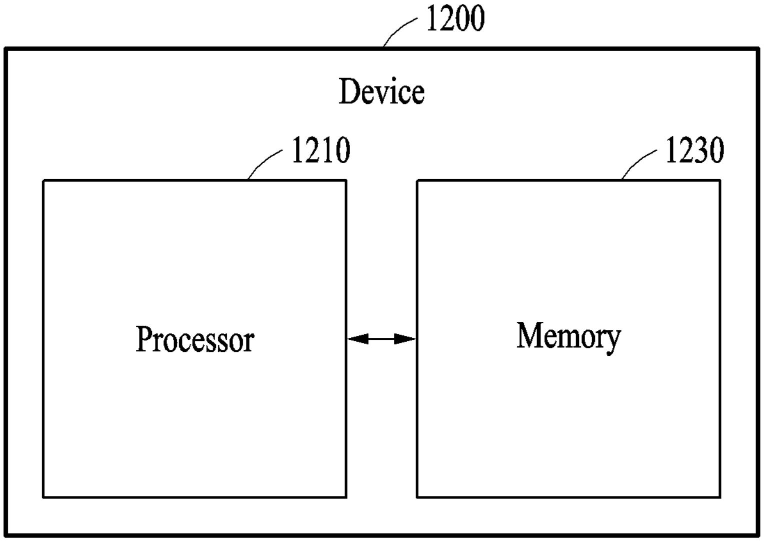
FIG. 12 is a diagram illustrating an example of a device, according to an embodiment.

FIG. 12 is a diagram illustrating an example of a device, according to an embodiment.

Referring to FIG. 12, a device 1200 may include a memory 1230 and a processor 1210. The device 1200 may include the encoder 110 or the decoder 130 of FIG. 1. The device 1200 may be a device that includes both the encoder 110 and the decoder 130 of FIG. 1.

The memory 1230 may store instructions (or programs) executable by the processor 1210. For example, the instructions may include instructions for executing an operation of the processor 1210 and/or an operation of each component of the processor 1210.

The processor 1210 may process data stored in the memory 1230. The processor 1210 may execute computer-readable code (for example, software) stored in the memory 1230 and instructions triggered by the processor 1210.

The processor 1210 may be a hardware-implemented data processing device having a circuit that is physically structured to execute desired operations. The desired operations may include, for example, instructions or code included in a program.

The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The encoder 110 and/or the decoder 130 of FIG. 1 may be stored in the memory 1230 and executed by the processor 1210 or embedded in the processor 1210. The processor 1210 may perform substantially the same operations as the encoder 110 and/or the decoder 130 referring to FIGS. 1 to 11. Accordingly, a detailed description thereof is omitted.

The components described in the embodiments may be implemented by hardware components including, for example, at least one digital signal processor (DSP), a processor, a controller, an ASIC, a programmable logic element, such as an FPGA, other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The examples described herein may be implemented using hardware components, software components, and/or combinations thereof. A processing device may be implemented using one or more general-purpose or special-purpose computers, such as, for example, a processor, a controller, an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be permanently or temporarily embodied in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), RAM, flash memory, and the like. Examples of program instructions include both machine code, such as those produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited number of drawings, it will be apparent to one of ordinary skill in the art that various technical modifications and variations may be made in the examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. A method of encoding a speech signal, the method comprising:

outputting, based on a first input speech signal of a previous timepoint and a second input speech signal of a current timepoint, a predicted signal that predicts the second input speech signal from the first input speech signal; and obtaining, based on the second input speech signal and the predicted signal, a residual signal by removing a correlation between the first input speech signal and the second input speech signal from the second input speech signal, and wherein the outputting of the predicted signal comprises:

extracting feature information for predicting the second input speech signal, based on the first input speech signal and the second input speech signal;

predicting a multi-dimensional kernel based on the feature information; and generating the predicted signal by applying the multi-dimensional kernel corresponding to a multiplication point to signal components of the first input speech signal at the multiplication point and surrounding timepoints thereof.

2. The method of claim 1, wherein the first input speech signal has a same signal length as the second input speech signal, and a greatest correlation with the second input speech signal.

3. The method of claim 1, further comprising outputting a bitstream, wherein the bitstream comprises:

a first bitstream encoding the feature information;

a second bitstream encoding a delay value; and a third bitstream encoding the residual signal, wherein the delay value indicates a degree to which the first input speech signal is delayed from the second input speech signal.

4. The method of claim 3, wherein the outputting of the bitstream comprises:

quantizing the feature information and the residual signal;

outputting the first bitstream by encoding quantized feature information; and generating the third bitstream by encoding a quantized residual signal.

5. A method of decoding a speech signal, the method comprising:

receiving bitstreams from an encoder;

outputting, based on a first bitstream and a second bitstream, a predicted signal that predicts a second input speech signal of a current timepoint from a first input speech signal of a previous timepoint; and outputting a restored speech signal obtained by restoring the second input speech signal, based on the predicted signal and a third bitstream, wherein the first bitstream encodes feature information for predicting the second input speech signal, wherein the second bitstream encodes a delay value indicating a degree to which the first input speech signal is delayed from the second input speech signal, and wherein the third bitstream encodes a residual signal obtained by removing a correlation between the first input speech signal and the second input speech signal from the second input speech signal, and wherein the outputting of the predicted signal comprises:

obtaining the first input speech signal based on the second bitstream;

predicting a multi-dimensional kernel based on the first bitstream; and generating the predicted signal by applying the multi-dimensional kernel corresponding to a multiplication point to signal components of the first input speech signal at the multiplication point and surrounding time-points thereof.

6. The method of claim 5, wherein the first input speech signal has a same signal length as the second input speech signal, and a greatest correlation with the second input speech signal.

7. A device for encoding a speech signal, the device comprising:

a memory configured to store one or more instructions; and a processor configured to execute the one or more instructions, wherein, when the one or more instructions are executed, the processor is configured to perform a plurality of operations, wherein the plurality of operations comprises:

outputting, based on a first input speech signal of a previous timepoint and a second input speech signal of a current timepoint, a predicted signal that predicts the second input speech signal from the first input speech signal; and obtaining, based on the second input speech signal and the predicted signal, a residual signal by removing a correlation between the first input speech signal and the second input speech signal from the second input speech signal, wherein the outputting of the predicted signal comprises:

extracting feature information for predicting the second input speech signal, based on the first input speech signal and the second input speech signal;

predicting a multi-dimensional kernel based on the feature information; and generating the predicted signal by applying the multi-dimensional kernel corresponding to a multiplication point to signal components of the first input speech signal at the multiplication point and surrounding time-points thereof.

8. The device of claim 7, wherein the first input speech signal has a same signal length as the second input speech signal, and a greatest correlation with the second input speech signal.

9. The device of claim 7, wherein the plurality of operations further comprises outputting a bitstream, wherein the bitstream comprises:

a first bitstream encoding the feature information;

a second bitstream encoding a delay value; and a third bitstream encoding the residual signal, wherein the delay value indicates a degree to which the first input speech signal is delayed from the second input speech signal.

10. The device of claim 9, wherein the outputting of the bitstream comprises:

quantizing the feature information and the residual signal;

outputting the first bitstream by encoding quantized feature information; and generating the third bitstream by encoding a quantized residual signal.

* * * * *